US010463036B2

(12) United States Patent
Tugel

(10) Patent No.: US 10,463,036 B2
(45) Date of Patent: Nov. 5, 2019

(54) BUG-REMOVAL VACUUM MACHINE

(71) Applicant: Buck Tugel, King City, CA (US)

(72) Inventor: Buck Tugel, King City, CA (US)

(*) Notice: Subject to any disclaimer, the term of this patent is extended or adjusted under 35 U.S.C. 154(b) by 162 days.

(21) Appl. No.: 15/660,379

(22) Filed: Jul. 26, 2017

(65) Prior Publication Data
US 2018/0027796 A1    Feb. 1, 2018

Related U.S. Application Data

(60) Provisional application No. 62/418,491, filed on Nov. 7, 2016, provisional application No. 62/367,254, filed on Jul. 27, 2016.

(51) Int. Cl.
| | | |
|---|---|---|
| *A01M 5/00* | (2006.01) | |
| *A01M 5/02* | (2006.01) | |
| *A01M 5/04* | (2006.01) | |
| *A01M 5/08* | (2006.01) | |
| *A01M 1/06* | (2006.01) | |
| *A01M 1/08* | (2006.01) | |
| *A01M 3/00* | (2006.01) | |
| *A01M 1/22* | (2006.01) | |

(52) U.S. Cl.
CPC .......... *A01M 5/08* (2013.01); *A01M 1/06* (2013.01); *A01M 1/08* (2013.01); *A01M 1/223* (2013.01); *A01M 3/00* (2013.01); *A01M 3/005* (2013.01); *A01M 5/00* (2013.01); *A01M 5/02* (2013.01); *A01M 5/04* (2013.01)

(58) Field of Classification Search
CPC    A01M 1/06; A01M 1/08; A01M 1/22; A01M 1/223; A01M 5/08; A01M 3/005; E01H 1/08; E01H 1/003; E01H 1/005; A47L 5/00; A47L 7/00; A47L 9/00; A47L 11/00
USPC .................................................. 43/112, 139
See application file for complete search history.

(56) References Cited

U.S. PATENT DOCUMENTS

| | | | | |
|---|---|---|---|---|
| 1,485,726 A * | 3/1924 | Setser | .................. | A01M 5/08 43/140 |
| 3,041,773 A * | 7/1962 | Gagliano | ............... | A01M 1/08 43/113 |
| 5,255,469 A * | 10/1993 | Sukup | ................... | A01M 5/08 43/140 |
| 6,685,389 B1 * | 2/2004 | Christensen | ........... | E01C 23/18 404/12 |
| 8,667,731 B2 * | 3/2014 | Panella | .................. | A01M 1/06 43/107 |
| 2015/0264913 A1 * | 9/2015 | Ganmor | ................. | A01M 5/08 43/139 |

* cited by examiner

*Primary Examiner* — Darren W Ark
*Assistant Examiner* — Steven J Shur
(74) *Attorney, Agent, or Firm* — Donald R. Boys; Central Coast Patent Agency LLC

(57) ABSTRACT

A bug-removal vacuum machine has a horizontal deck, and a structure providing a trapezoidal-shaped air passage directing insects drawn by vacuum-induced air flow through an electrified killing matrix, and into a collection tray.

5 Claims, 5 Drawing Sheets

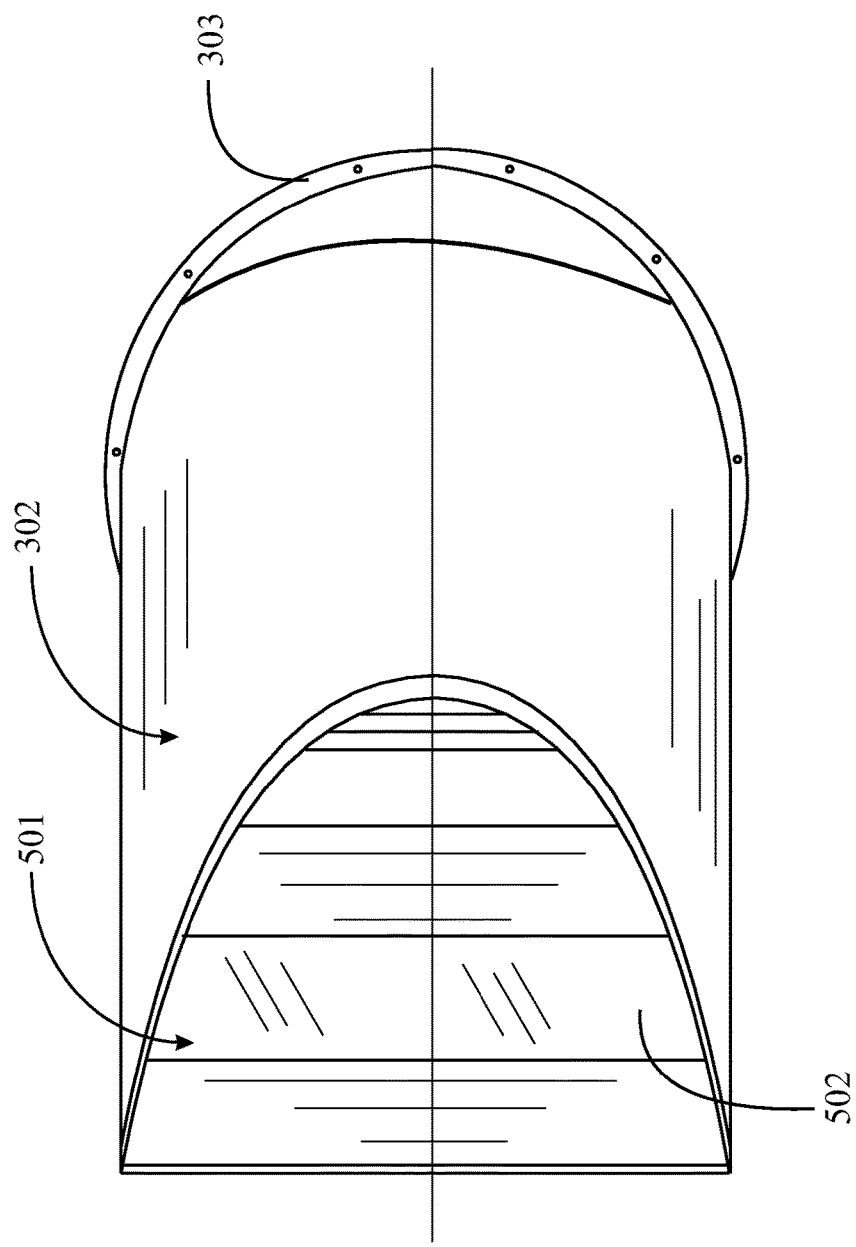

BUG-REMOVAL VACUUM MACHINE

CROSS-REFERENCE TO RELATED DOCUMENTS

The present patent application is a non-provisional application of provisional application 62/367,254, filed on Jul. 27, 2016 entitled "Agricultural Bug Vacuum Machine" and provisional application 62/418,491, filed on Nov. 7, 2016 entitled "Agricultural Bug Vacuum Machine". Disclosure of prior applications are incorporated herein in its entirety by reference.

BACKGROUND OF THE INVENTION

1. Field of the Invention

The present invention is in the technical area of combatting insect infestation in crops, and pertains more particularly to a machine incorporating vacuum for efficiently removing insects from plants.

2. Description of Related Art

Vacuum-operated machines are known in the art for operating over plants, for dislodging and killing insects that feed on the growing plants. At the time of the present invention, however, all such machines by design are inefficient in creating a proper air flow over and around the plants to efficiently remove and destroy insects. The problems in the art are, in the view of the present inventor, due to the geometry of elements of the prior-art machines, that direct and manage flow of air brought into the machine to flow around the plants.

BRIEF SUMMARY OF THE INVENTION

In one embodiment of the present invention a bug-removal vacuum machine is provided, comprising a generally horizontally-disposed deck, having a centerline, a front edge and a rear edge at right angle to the centerline, a first side edge and a second side edge equally spaced from and parallel to the centerline, a first side wall extending a dimension below the deck along the first side edge, and a second side wall extending the same dimension below the deck along the second side edge, a first baffle element disposed along the first side wall, on a side toward the centerline, extending below the deck for a vertical distance, a second baffle element disposed along the second side wall, on a side toward the centerline, extending below the deck for the same vertical distance, a rectangular opening through the deck, the opening having a front edge and a rear edge defining a width for the rectangular opening, and a powered air blower coupled through a plenum to the rectangular opening above the deck, such that operating the blower draws air from beneath the deck, wherein the first and second baffle elements are mirror images, having each a variable rectangular cross section, such that a passage for air formed by an underside of the deck, exposed planes of the baffles, and a horizontal plane at the lower extremity of the first and second side walls, defines a first isosceles trapezoid with a first lower base of a greater length than a first upper base, and the passage formed by the underside of the deck, the exposed planes of the baffles, and the horizontal plane at the lower extremity of the first and second side walls, defines a second isosceles trapezoid with a second lower base shorter than the first lower base, and a second upper base shorter than the second upper base, such that air is drawn preferable from the front end of the passage, and is directed inward and upward by the baffles to the rectangular opening.

In one embodiment, the rectangular opening through the deck extends in length across the underside of the deck fully between the exposed surfaces of the first and the second baffles. In one embodiment, the machine further comprises brush elements extending along the length of each of the sidewalls, at a lower extremity of the sidewalls, downward for a specific height, the brush elements, with the machine in use, traveling along a ground surface beneath the machine. In one embodiment, the machine further comprises an electrified grid of elements through which air and insects must pass after the blower, killing the insects. And in one embodiment, the machine further a collection chamber joined to the blower, directed to one side of center, having screened opening to sides for passing air from the blower, and a pan at a lower extremity collecting insects.

BRIEF DESCRIPTION OF THE SEVERAL VIEWS OF THE DRAWINGS

FIG. 5 is a top plan view of the capturing component of FIG. 4.

DETAILED DESCRIPTION OF THE INVENTION

Figure 1:
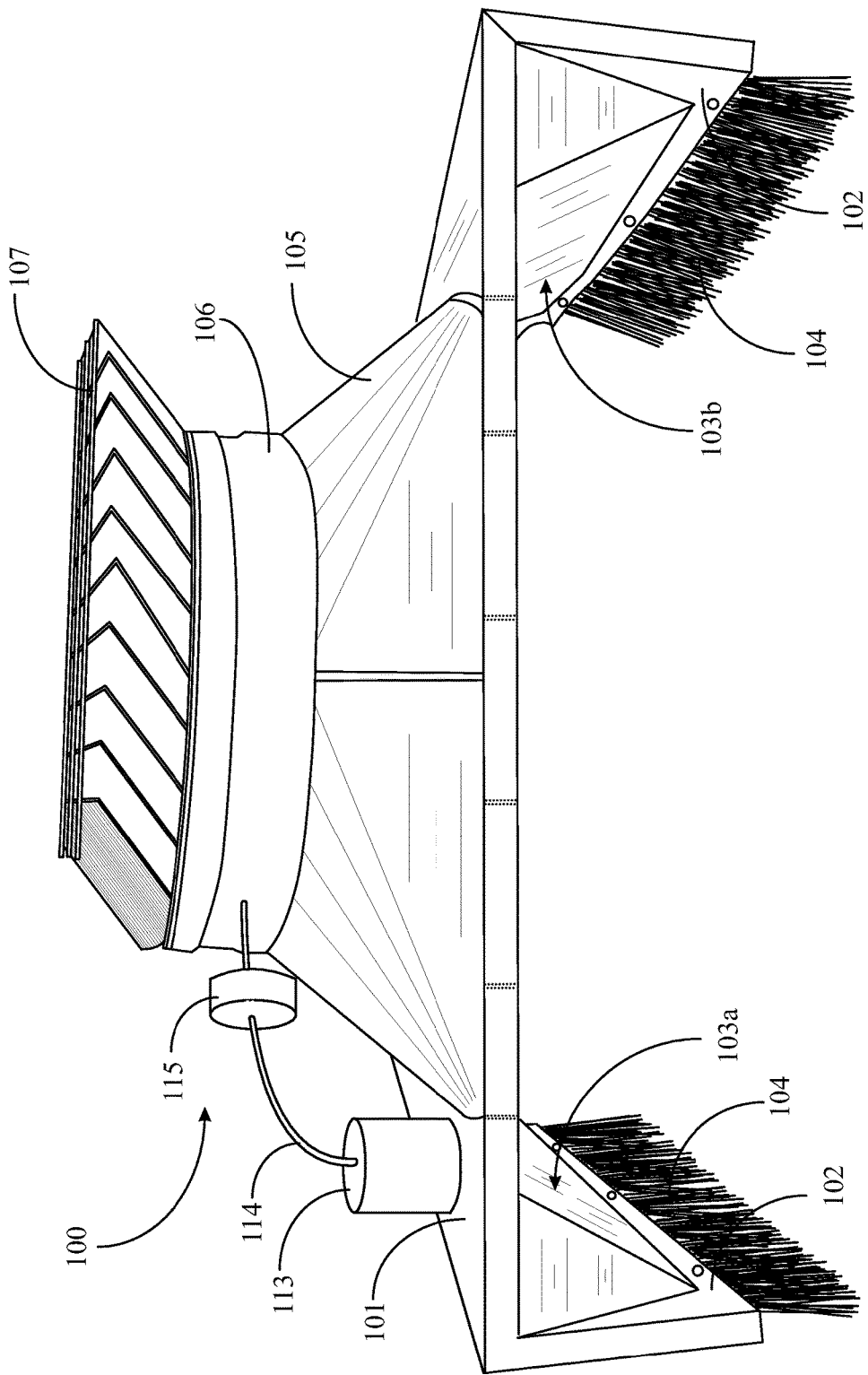
FIG. 1 is a front elevation view of a portion of a vacuum machine in an embodiment of the invention

Referring now to FIG. 1, a partial structure 100 of an insect-removal machine is shown in perspective in an elevation view from in front of the machine. Structure 100 is in part based on a deck 101, which may be fabricated from a metal like aluminum, or other suitable material. There are two side walls 102 extending downward from opposite edges of deck 101, and brushes 104 fastened along a bottom edge of each of sidewalls 102. The brushes trail along ground level, and provide for variation in the height at which structure 100 may be carried along and over growing plants, from which it may be desired to remove insects. In some circumstances, the brushes may contact the ground and be somewhat deformed, and in other instances the brushes may travel a short distance above ground level. The brushes also provide a barrier to of air entering the structure from the sides below the side walls.

A plenum 105 connects between an opening in deck 101 and a blower 106, which blower forces air upward out of the structure from the plenum, and in some embodiments through a killing mechanism 107, which serves to kill insects drawn into and through the structure. The killing mechanism may take several forms, but is, in exemplary embodiments, a matrix of panels or wires formed over the path of the airflow from the blower, the matrix electrically charged in a manner that insects coming into contact with elements of the matrix are electrocuted.

The electrical grid is not always used, and in some embodiments a reservoir 113 contains a vinegar solution. There is a 12-volt pump 115 providing the solution through a line 114 to a spray nozzle pointed to the fan in the airstream below the fan. The vinegar solution is known by the inventor to be lethal to insects captured.

The opening through the deck is shown in enabling detail in FIG. 2 described below. There are two baffles 103a and 103b positioned inside of each of sidewalls 102, and the baffle elements guide air drawn into the region between the sidewalls upward to and through the opening in the deck. The baffle elements are each abutted to and disposed between both the inner surface of a sidewall and the underside of the deck.

Figure 2:
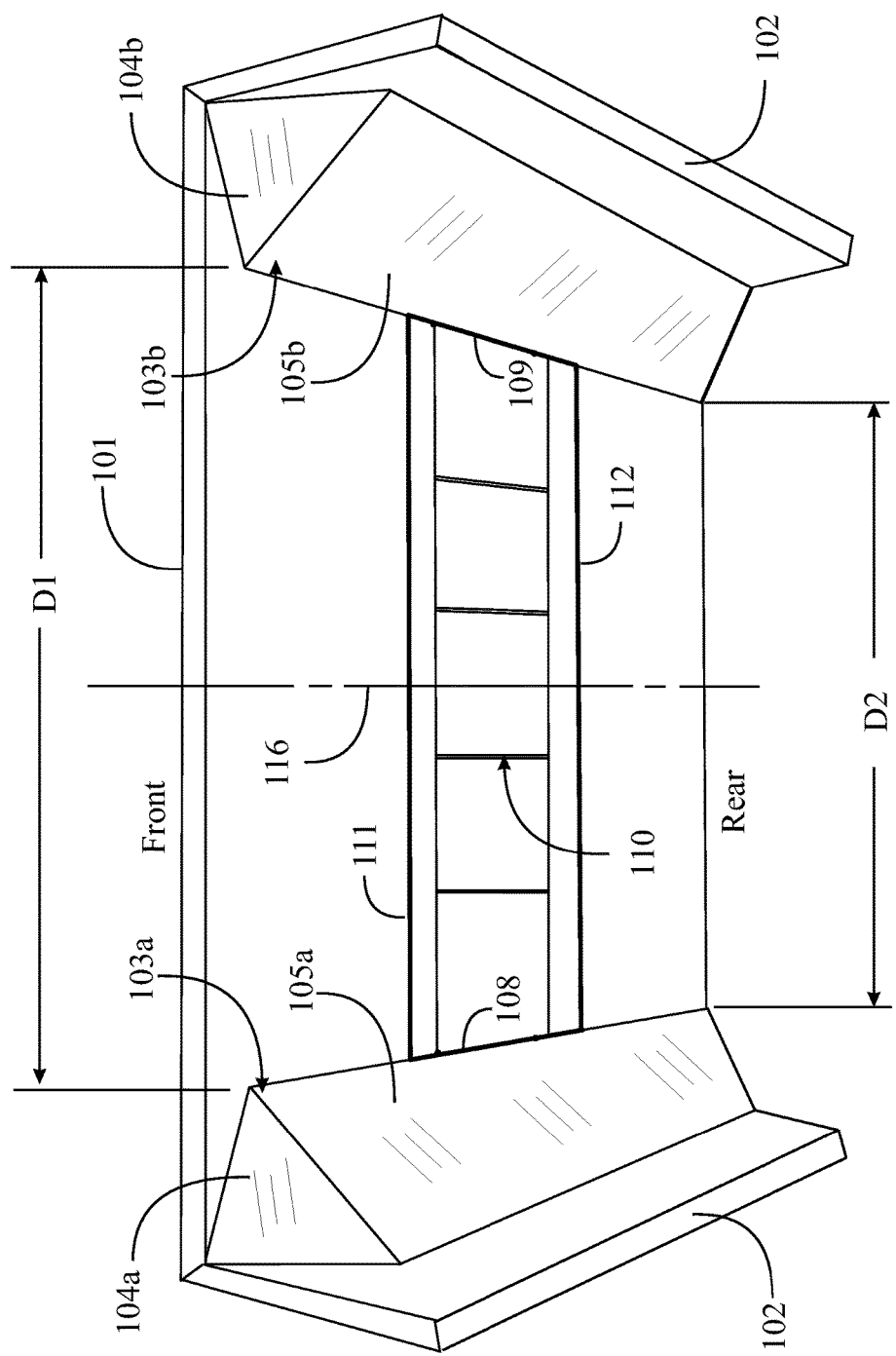
FIG. 2 is a view from underside of the vacuum machine structure of FIG. 1.

FIG. 2 is a view from underside of the vacuum machine of FIG. 1. A centerline 116 of deck 101 is shown in this view. The opening through deck 101 referred to above, but not seen in FIG. 1, is seen in FIG. 2 as defined by long edges 111 and 112, across the width of the structure, and short edges 108 and 109 in the direction of the length of the structure, in the direction of travel in use. Baffles 103a and 103b are mirror images of one another, and comprise a triangular cross section, with one baffle positioned along the inside of side wall 102 on each side of the machine. Baffle 103a has a front surface 104a, and a side surface 105a, while baffle 103b has a front surface 104b and a side surface 105b. It may be seen in FIG. 2 that an inside edge of baffle 103a coincides with edge 108 of the opening through the deck, and an inside edge of baffle 103b coincides with edge 109 of the opening.

The front of the baffle structure at the deck level, represented by dimension D1, is wider than at the rear of the machine, represented by dimension D2. This tapered effect causes the opening through the deck to be trapezoidal in nature, such that edges 111 and 112 are parallel, but edge 111, being closer to the front, is a bit longer than edge 112, which is closer to the rear. Opposite edges 108 and 109 are of the same length, but extend at opposite angles. A welded matrix of rods 110 are not essential to the invention, but form a barrier for relatively large debris that might be drawn into the machine in operation, such as soda cans, plastic membranes, and the like. This matrix may be more closely spaced, or less closely spaced, in alternative embodiments, or may be left out altogether.

An important purpose of baffles 103a and 103b, and the placement of the baffles, particularly the edges coinciding with the edges of the opening through the deck, is to control and guide air flow into the structure, and upward into plenum 105, to best advantage. Referring again to FIG. 1, structure 100 in that view is upright in an aspect that the machine would be carried by a tractor along a path, with side walls 102 spanning opposite sides of one or more rows of plants in the path, with brushes 104 trailing at or near ground level. Two or more structures 100 may be carried side by side, and spaced laterally to service more rows of plants simultaneously. The direction of travel is, in one embodiment, with the wide end forward, which in FIG. 1 implies that the machine would traverse toward the viewer.

As structure 100 is carried along a path, blower 106 operates at high capacity to draw air, primarily from the front of the structure, over and around the details of plants, capturing insects from the plants, and upward through plenum 105, and out through killing mechanism 107. The air moved by the blower is drawn in from primarily the front of the machine above and on both sides of plants in the path, and is guided inward by the tapered shape of the baffles and side walls, which serves to increase the velocity of the air, and then upward by surfaces 105a and 105b of the baffles, and the air enters the opening through the deck with a strong upward component of flow. In the figures, the surfaces 105a and 105b are depicted as essentially planar, but in some cases, there may some curvature to the guiding surface. The more important feature is that the edges of the baffles align with the edges of the opening through the deck.

In prior art structures, the side walls are typically curved from vertical to horizontal, and there are no baffles, so air is directed horizontally over the opening through the deck, from both sides, creating a collision situation wherein a substantial portion of the air drawn in at first is not guided into and through the opening, but is deflected turbulently downward, such that insects are not efficiently trapped and drawn into the turbine and into the killing mechanism 107.

Figure 3:
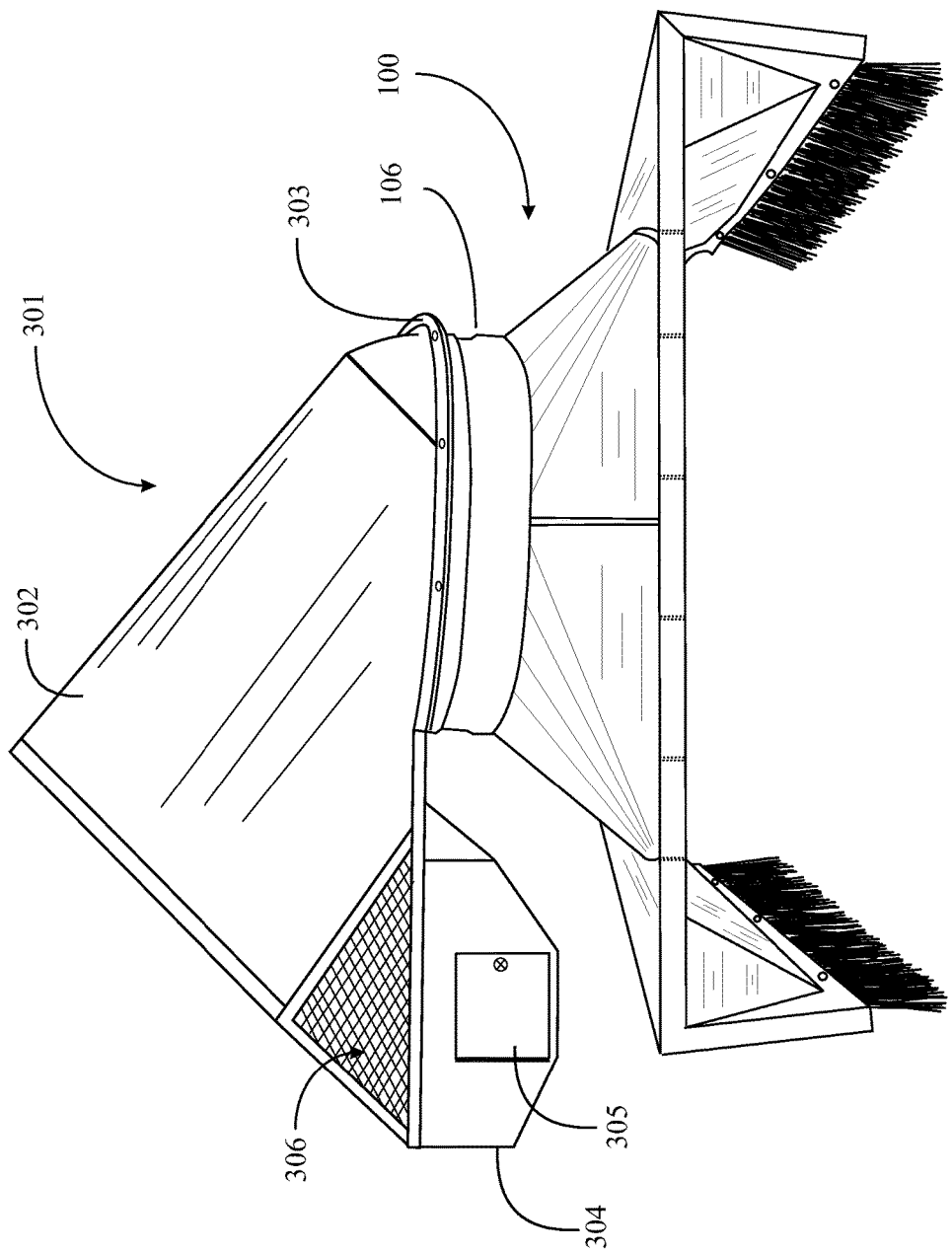
FIG. 3 is a perspective view of the vacuum apparatus of FIGS. 1 and 2 with an additional capturing component.

FIG. 3 is a perspective view of the insect-gathering structure 100, with an additional structure 301 for capturing and collecting insects, typically dead insects, that have been drawn from plants through blower 106. Structure 100 and structure 301 together comprise a bug-removal and collection machine. Capturing structure 301 comprises a flange 303, to mate with a companion flange as part of structure 100, a hood-like semi-cylindrical structure 302, and a collection tray 304 below the level of flange 303 to one side. The tray is for collecting insects and portions of insects that are captured and suctioned through blower 106. In embodiments incorporating this capture structure it is necessary that the upper extremity of structure 100 have a flange matching that of structure 301, enabling the two units to be joined, and for the capture structure to be removed at need, to access and maintain or repair portions of both units, such as the blower and the screens 107 described above.

Captured insects drawn through blower 106 are directed with the flow of air induced by the blower to one side, toward the capture tray 304. A portion of sides of structure 302, labeled 306 in FIG. 3, is restricted only by an expanded metal screen in one embodiment, and there is a similar opening above the capture tray at the other end of the capture tray. In one embodiment, the capture tray may be removably mounted to the structure, and in other embodiments the tray may be a contiguous part of the structure. In some embodiments, there is a door 305 enabling removal of insects and debris. A purpose of screens 306 is to allow air to escape the structure, rather than creating a back-pressure that would impair the operation of the machine.

Figure 4:
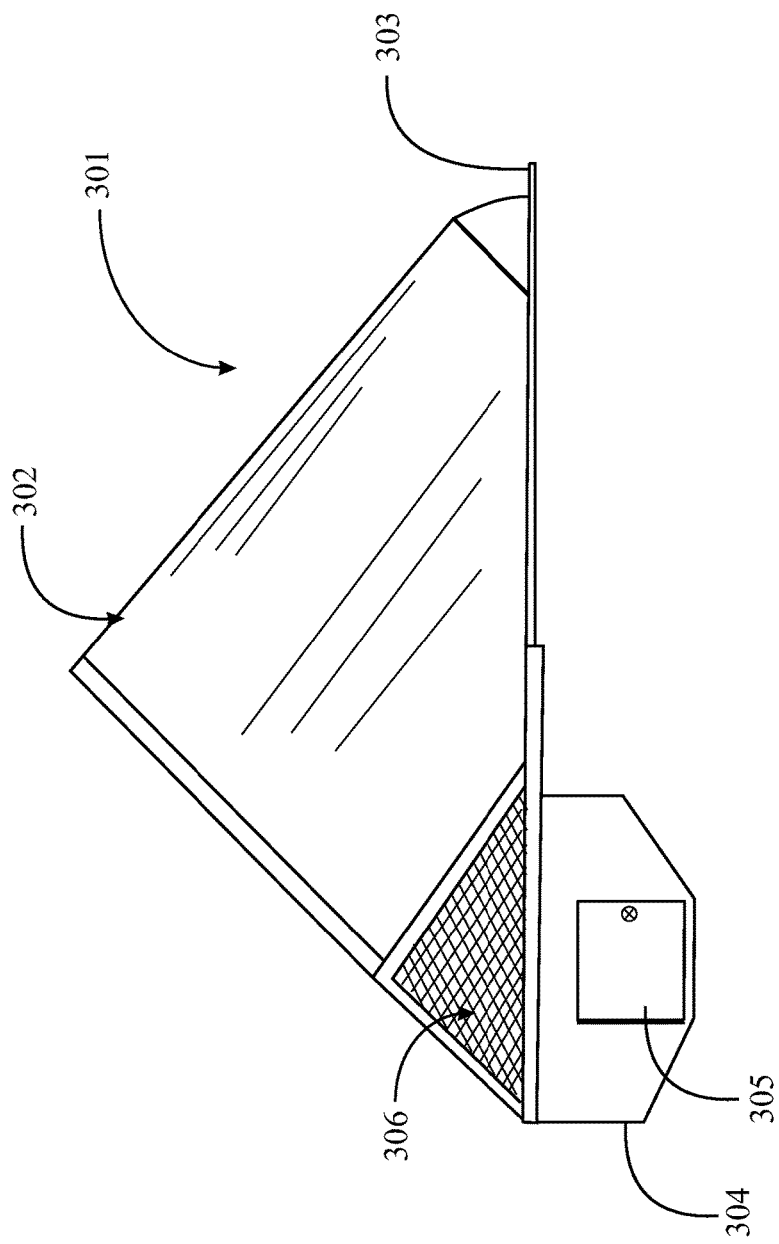
FIG. 4 is an elevation side view of the capturing component of FIG. 3, in an embodiment of the invention.

FIG. 4 is a side elevation view of structure 301 showing the capture structure removed from the blower structure at the flange interface. FIG. 5 is a top plan view of capture structure 301 showing the flange 303 and the relationship of the hood structure 302 to the flange and the capture tray. End 501 of the hood structure is shown completely open in this view, and horizontal surface 502 is the bottom of tray 304. In most embodiments opening 501 is covered with an expanded metal screen, as is shown for opening 306 in FIG. 3. The screen is not shown, so detail below the screen may be better displayed in the figure.

A purpose of openings 306 and 501 is to provide very little restraint for air brought up through the blower, such that the air easily expands and the pressure drops, so insects entrained will tend to fall into the collection tray rather than be expelled through the screened openings.

In one embodiment, the collection structure is aluminum, and it is desirable that the weight of the structure be minimized. Other metals may also be suitable, and the structure is not limited to aluminum. In some embodiments, the bug-vacuum machine in embodiments of the invention is carried by a tractor as a suspended cantilever structure. In other embodiment, the machine may be mounted on a rolling structure, having wheels that roll along the ground.

The skilled artisan will understand that the embodiments described herein are exemplary only, and many details may vary in different embodiments within the scope of the invention. In various alternative embodiments, different materials may be used, different blower mechanisms may be used, power may vary, dimensions may vary, and many other details may differ within the scope of the invention.

The invention claimed is:

1. A bug-removal vacuum machine, comprising:
   a horizontal, planar, rectangular deck, having a centerline, a first width and a first length, an underside surface and a parallel upper side surface, a first front edge and a first rear edge, and a first side edge and a second side edge;
   a first vertical sidewall joined to and extending below the deck along the length of the first side edge, and a second vertical sidewall joined to and extending below the deck along the length of the second side edge, the sidewalls each having an outer surface facing away from the centerline and an inner surface facing toward the centerline;
   a first baffle abutted to and disposed between both the inner surface of the first sidewall and the underside of the deck, the first baffle providing a first planar surface at a first angle from the inner surface of the first sidewall to the underside of the planar deck, defining a first straight line of intersection with the underside of the planar deck oriented at a second angle toward the centerline in the direction from front to back;
   a second baffle abutted to and disposed between both the inner surface of the second sidewall and the underside of the deck, the second baffle providing a second planar surface at a third angle from the inner surface of the second sidewall to the underside of the planar deck, defining a second straight line of intersection with the underside of the planar deck oriented at a fourth angle toward the centerline in the direction from front to back;
   an opening through the deck, substantially centered between the first front edge and the first rear edge of the planar deck, the opening having a second front edge and a second rear edge, both at a right angle to the centerline, defining a width for the opening, the opening having a third side edge colinear with the first straight line of intersection, and a fourth side edge opposite the third side edge, the fourth side edge colinear with the second straight line of intersection; and
   a powered air blower coupled through a plenum above the planar deck to the opening through the deck, such that operating the blower draws air through the opening from beneath the deck;
   wherein the shape defined by the first and the second sidewalls, the baffles, the underside of the deck, and a horizontal plane parallel with the deck at a lower extremity of the sidewalls, defines a planar cross-section at a right angle to the centerline, that decreases in area from front to back, such that air is drawn preferably from the front and is directed inward and upward by the baffles to the rectangular opening.

2. The bug-removal vacuum machine of claim 1 further comprising brush elements extending along the length of each of the sidewalls, at the lower extremity of the sidewalls, downward for a specific height.

3. The bug-removal vacuum machine of claim 1 further comprising an outlet for air pulled through the plenum from beneath the deck, the outlet comprising an electrified grid of elements through which air and insects entrained in the air must pass after the blower, the electrified grid for killing the insects.

4. The bug-removal vacuum machine of claim 1 further comprising a collection chamber joined to the blower after the electrified grid, the collection chamber directed to one side of the centerline.

5. The bug-removal vacuum machine of claim 4, wherein the collection chamber has a screened opening for passing air from the blower, and a pan below the screened opening for collecting insects.

* * * * *